United States Patent Office 3,228,864
Patented Jan. 11, 1966

3,228,864
PHOTOCHEMICAL PROCESS FOR PREPARING FLUORINATED THREE MEMBERED RINGS
Sebastian V. R. Mastrangelo, Wilmington, Del., assignor to E. I. du Pont de Nemours and Company, Wilmington, Del., a corporation of Delaware
No Drawing. Filed Jan. 22, 1962, Ser. No. 167,951
4 Claims. (Cl. 204—163)

This invention is directed to a process for preparing $:CF_2$ in the singlet state and also to a process for reacting $:CF_2$ in the singlet state with compounds of structure $R^2R^3C=X$ to form new compounds having the structure

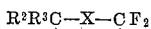

where $R^2$ and $R^3$ are fluorine, chlorine or perfluoroalkyl groups and X is sulfur, the CFCl group or the $CF_2$ group.

Although various methods have been described for preparing compounds of structure

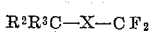

none are capable of producing all of the different types corresponding to X being S, CFCl and $CF_2$. Also, these various methods usually require the use of several steps to obtain the desired compounds from readily available starting materials.

It is therefore an object of this invention to provide a convenient and readily controlled method for preparing $:CF_2$ in the singlet state.

It is another object of this invention to provide a method for forming compounds of structure

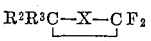

from readily available starting materials wherein $R^2$ and $R^3$ are fluorine, chlorine or perfluoroalkyl groups and X is sulfur, the CFCl group or $CF_2$ group.

It is still another object of this invention to form new and useful compounds having the structure

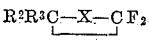

wherein $R^2$ and $R^3$ are fluorine, chlorine or perfluoroalkyl groups and X is sulfur, the CFCl group or the $CF_2$ group. These and other objects will become apparent from the following description and claims.

The objects of the present invention have been attained by the discovery that $:CF_2$ in the singlet state reacts readily with compounds of the structure $R^2R^3C=X$ to form fluorinated three membered rings.

More specifically, the present invention is directed to a process for producing $:CF_2$ in the singlet state which comprises subjecting a compound $R^1CF=CF_2$ and from one to about 50 mole percent of a diluent to ultraviolet radiation in the range of 2000 A. to 3000 A. at a temperature of from 20° to 250° C. and a pressure of at least ½ atmosphere; wherein $R^1$ is chosen from fluorine, chlorine and perfluoroalkyl groups containing from one to 10 carbon atoms; said diluent is chosen from alkanes, alkenes and compounds of structure $R^2R^3C=X$ which have sufficient vapor pressure at the reaction temperature to provide the required concentration of diluent in the vapor phase, $R^2$ and $R^3$ are chosen from fluorine, chlorine and perfluoroalkyl groups containing from one to ten carbons, X is chosen from sulfur, CFCl and $CF_2$ groups and wherein said diluent and $R^1CF=CF_2$ are different.

The present invention is also directed to a process for preparing compounds of structure

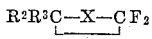

wherein $R^2$ and $R^3$ is fluorine, chlorine or a perfluoroalkyl group and X is sulfur, CFCl group or $CF_2$ group, which comprises producing $:CF_2$ in the singlet state and reacting same with compounds of structure $R^2R^3C=X$ in the vapor phase at a temperature of from 20° to 250° C. and a pressure of at least ½ atmosphere and recovering the products from the reaction mixture.

The $:CF_2$ consists of a carbon atom to which are bonded two fluorine atoms. The carbon atom retains two free bonding electrons and so the $:CF_2$ may exist in two states, the singlet and triplet. The terms singlet and triplet describe the relationship between the two free electrons. If the two electrons have opposite spins, they occupy the same electronic orbital and are paired, giving a single adsorption line in the electronic spectrum, hence the name singlet. When the two electrons have the same spin, they occupy different orbitals and are unpaired, giving three adsorption lines in the electronic spectrum, hence the name triplet. The singlet state is *not* a diradical in the sense that radicals have free, unpaired electrons but is a molecular compound. The triplet state, having two unpaired electrons, is indeed a diradical. For a more complete discussion of this subject see "Atomic Spectra and Atomic Structure" by Herzberg, Dover Publications, 1944.

In terms of physical structure, the singlet $:CF_2$ is a bent molecule

wherein the angle between the two fluorines is 110–130°, most probably about 120° (Venkateswarlu, Physical Review, 77, 6761 (1950)). The triplet state is linear and can be represented as

wherein the angle between the fluorines is 180°.

The triplet state can be produced in several ways, for instance by pyrolysis of tetrafluoroethylene, pyrolysis of $CHClF_2$ (Errede et al., U.S. 2,979,539) and decomposition of perfluorocyclobutane by high frequency electric discharge. In all of these cases the $:CF_2$ so generated reacts with tetrafluoroethylene to form hexafluoropropylene. The $:CF_2$ prepared by the above methods is triplet since $:CF_2$ in the singlet state reacts with tetrafluoroethylene to form perfluorocyclopropane exclusively. The only known method for producing $:CF_2$ solely in the singlet state is by the procedure to be described hereinafter.

Other chemical species are known which exist in a singlet and triplet state and can be isolated in the singlet and triplet state. A well known stable compound containing carbon in the same electronic configuration as singlet $:CF_2$ is carbon monoxide. A well known molecule that exists in the triplet state is oxygen.

The methylene radical $:CH_2$ also exists in singlet and triplet states. Contrary to $:CF_2$, however, singlet $:CH_2$ is extremely reactive while triplet $:CF_2$ is selective in its reactions. Thus $:CF_2$ and $:CH_2$ behave in exactly opposite manners. Moreover, singlet $:CF_2$ is far more selective than either form of $:CH_2$. This surprising and unexpected discovery is distinctively characteristic of the present invention.

Singlet $:CF_2$ is produced according to this invention by subjecting $R^1CF=CF_2$ ($R^1$ being defined as above) to ultraviolet radiation of wave length 2000–3000 A. in the presence of from one to 50 mole percent of a diluent. The diluent may be an alkane, an alkene, or a compound $R^2R^3C=X$ ($R^2$, $R^3$ and X being defined as above). If $R^2R^3C=X$ is used as a diluent, it must be a different molecular species than $R^1CF=CF_2$. Excess $R^1CF=CF_2$ is not suitable as a diluent. The diluent $R^2R^3C=X$ may be the same as the second reactant $R^2R^3C=X$ but it may also be different.

The diluent must have sufficient vapor pressure to have the required amount present in the vapor phase at the reaction temperature used. The lower alkanes and alkenes such as ethylene, propylene, butylene, ethane, propane and butane are preferred, particularly when $:CF_2$ is generated from $C_2F_4$. Acetylenes and aromatic hydrocarbons cannot be used. Acetylenes interfere with the reaction in some unknown manner and aromatic hydrocarbons, such as benzene, absorb ultraviolet light to strongly that little or no reaction occurs.

If the diluent is omitted, the $:CF_2$ so produced is primarily in the triplet state. This demonstrated in the examples which follow where it is shown that the triplet $:CF_2$ reacts with tetrafluoroethylene to form hexafluoropropylene which is then copolymerized with excess tetrafluoroethylene, the polymer being of rather low molecular weight. Singlet $:CF_2$ undergoes little or no reaction with the diluent hydrocarbons whereas triplet $:CF_2$ apparently reacts rather readily and is consequently selectively removed.

A method for isolating singlet $:CF_2$ involves trapping the singlet $:CF_2$ in a solid inert matrix composed of unreacted starting material and diluent. Other inert materials such as krypton may be present. More particularly, singlet $:CF_2$ would be formed as described in the previous paragraphs and then rapidly condensed on a surface, which could be made of glass, quartz or glazed porcelain, maintained below 95° K. The singlet $:CF_2$ would then be isolated in the solid matrix and would be stable so long as the temperature is maintained below 95° K.

Singlet $:CF_2$ reacts with compounds of structure $R^2R^3C=X$ to form

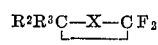

$R^2$, $R^3$ and X are as previously defined. The reactant $R^2R^3C=X$ must have sufficient volatility to maintain sufficient material in the vapor phase to react with the singlet $:CF_2$ formed. However, since a wide variety of reaction pressures and temperatures are available, practically any compound $R^2R^3C=X$ may be used. Typical examples of reactants $R^2R^3C=X$ and the products obtained therefrom by reaction with singlet $:CF_2$ are:

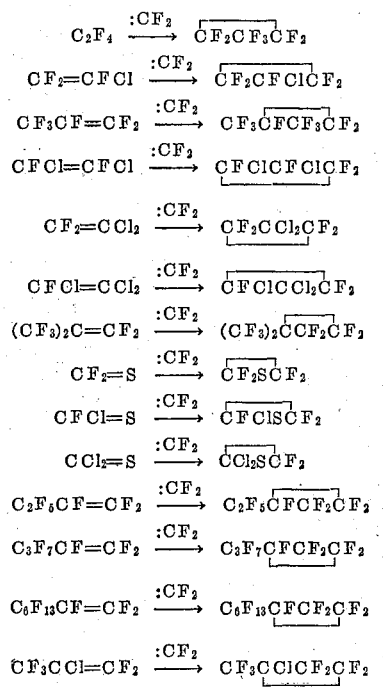

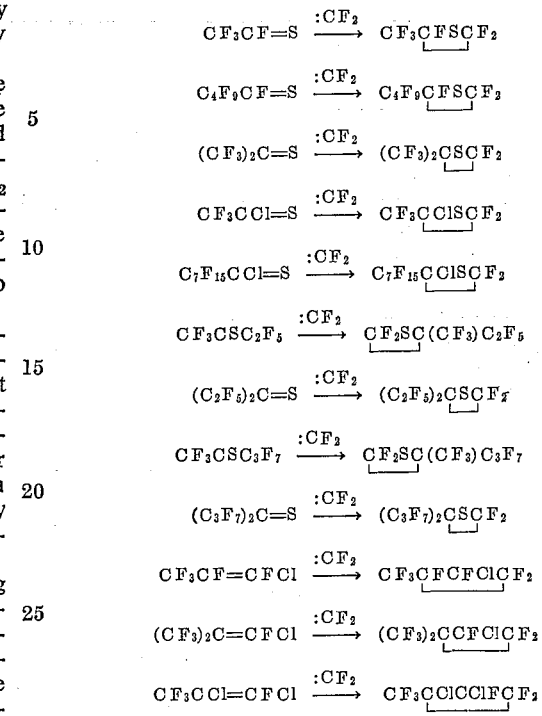

The compounds $R^1CF=CF_2$ which are the source of $:CF_2$ have $R^1$ as fluorine, chlorine and perfluoroalkyl groups of from one to 10 carbons. Examples are tetrafluoroethylene, chlorotrifluoroethylene, perfluoropropylene, perfluoro-1-butene, perfluoro-1-pentene, perfluoro-1-hexene and the like. All of these compounds are well known to the art.

The process is carried out by admitting $R^1CF=CF_2$ (the source of singlet $:CF_2$), the diluent and the reactant $R^2R^3C=X$ to a reaction vessel and subjecting the mixture to ultraviolet radiation until the reaction is substantially complete. Singlet $:CF_2$ first forms and then reacts with $R^2R^3C=X$ to form the desired three membered rings. The products are then removed from the reaction zone and separated by any convenient means. The diluent and any unreacted starting materials are then returned to the reaction zone if desired. A continuous reaction system may also be used wherein the source of singlet $:CF_2$, the diluent and the second reactant are flowed through a zone which is irradiated with ultraviolet light and, after leaving the irradiated zone, the products are separated from the reactants and diluent, the latter being recycled.

The useful wave lengths of ultraviolet light vary between 2000 A. and 3000 A. Wave lengths shorter than 2000 A. are not useful both because they cause decomposition and because quartz or glass are not transparent to such light. Wave lengths greater than 3000 A. do not cause the reaction. Reaction temperatures below 20° C. could be used with certain reactants, for instance $C_2F_4$, but there is no advantage gained thereby. Reaction temperatures greater than 250° C. are undesirable both because $C_2F_4$ dimerizes to octafluorocyclobutane to an undesirable extent and because certain of the products are thermally unstable above about 250° C. Generally, the preferred temperature range is from about 80° to 180° C.

Any reaction pressure above 0.5 atmosphere may be used so long as sufficient reactants and diluent can be maintained in the vapor phase. The system does not behave well below 0.5 atmosphere since the yiled of singlet $:CF_2$ decreases markedly. The preferred pressure range is from 0.5 to 5 atmospheres. The upper limit is primarily due to equipment limitations.

A number of different types of ultraviolet light sources may be used. The best known are carbon arcs and hydrogen lamps. The intensity of the ultraviolet light source can be used to control the rate of the reaction. However, within limits, the ultraviolet light source does not control the course of the reaction. Therefore, the primary consideration as to source intensity then is the desired reaction velocity in conjunction with the size of the reaction vessel. Normally it is not necessary to have the ultraviolet light source in the reaction vessel. It does not matter whether the ultraviolet light passes through air or not. Usually it is not necessary to filter the ultraviolet light either, unless the reaction system is arranged such that the light is generated in such manner that wave lengths shorter than 2000 A. can enter the reaction vessel. In this case, a filter to remove the short wave lengths is necessary. For this application, quartz glass is sufficient.

Representative examples illustrating the present invention are as follows:

EXAMPLE I

Mixtures of tetrafluoroethylene and a diluent were irradiated with a Hanovia Model 54A–10L Burner (Engelhard Hanovia, Inc., Lamp Division) in a one inch O.D. x 12 inch quartz pipe with ¼ inch walls capable of withstanding 600 p.s.i.g. pressure. The quartz pipe was fitted with a ribbon heater, two thermocouples located at mid points beneath the heater, a pressure gauge and a means for removing product. (Tetrafluoroethylene, in this case, acts as both the source of singlet :$CF_2$ and as the compound $R^2R^3C=X$.) The tetrafluoroethylene was fed from a high pressure cylinder through a silica-gel scrubber to remove polymerization inhibitor ("Terpene-B") into a feed system which also contained a feed source for the hydrocarbon diluent, a second reactant, a vacuum source (for removing air), a pressure gauge and appropriate valves. The feed system was separated from the quartz reactor by a valve so that the pressure within the quartz pipe could be maintained independent of the pressure within the feed system.

For convenience, the products were analyzed by means of a 10 meter vapor phase chromatograph containing 10% di-n-butyl maleate on Chromosorb (F and M Scientific Corp., New Castle, Delaware), at 25° C. in combination with a time-of-flight mass spectrometer (Bendix). Retention times for various compounds are shown in Table I. The reaction conditions and results are shown in Table II.

*Table I*

| Compound | Retention Time | Compound | Retention Time |
|---|---|---|---|
| $C_2F_4$ | 8'20" | $\lceil CF_2CFClCF_2 \rceil$ | 22'55" |
| $\underline{CF_2CF_2CF_2}$ | 9'2" | $CF_3CF=CFCF_3$ | 11'20" |
| $CF_3CF=CF_2$ | 10'40" | $(CF_3)_2C=CF_2$ | 15'55" |
| $\lceil (CF_2)_4 \rceil$ | 9'50" | $CF_3CFCF_2CF_2$ | 16'45" |
| $CF_2=CFCl$ | 16'25" | $\underline{CF_2S-CF_2}$ | [1] 3'35" |

[1] On a 4 meter polypropylene glycol on "Chromosorb" column at 60° C.

*Table II*

| Run No. | Source of Singlet:$CF_2$ Mole Percent | Second Reactant and/or Diluent, Mole Percent | P.s.i.a. | Min. | °C. | Products | Percent Yield |
|---|---|---|---|---|---|---|---|
| 1 | $C_2F_4$, 96.4 | $C_2H_4$, 3.6 | 38.7 | 447 | 180 | $\underline{CF_2CF_2CF_2}$ | 51.7 |
|   |   |   |   |   |   | $\lfloor (CF_2)_4 \rfloor$ | 0.9 |
|   |   |   |   |   |   | polymer | 47.4 |
| 2 | $C_2F_4$, 89 | $C_2H_4$, 11 | 44.6 | 202 | 210 | $\lfloor (CF_2)_3 \rfloor$ | 51.7 |
|   |   |   |   |   |   | $\lceil (CF_2)_4 \rceil$ | 2.0 |
|   |   |   |   |   |   | polymer | 46.3 |
| 3 | $C_2F_4$, 65 | $C_2H_4$, 35 | 45.7 | 325 | 170 | $\lceil (CF_2)_3 \rceil$ | 92.8 |
|   |   |   |   |   |   | $\lceil (CF_2)_4 \rceil$ | 0.8 |
|   |   |   |   |   |   | polymer | 6.4 |
| 4 | $C_2F_4$, 80 | $C_3H_8$, 20 | 43.6 | 176 | 160 | $\lceil (CF_2)_3 \rceil$ | 65.7 |
|   |   |   |   |   |   | polymer | 34.3 |
| 5 | $C_2F_4$, 64 | $C_3H_8$, 36 | 47.4 | 165 | 160 | $\lceil (CF_2)_3 \rceil$ | 92.1 |
|   |   |   |   |   |   | polymer | 7.9 |
| 6 | $C_2F_4$, — | $C_6H_6$, vap | 30.8 | 145 | 120 | $\lceil (CF_2)_3 \rceil$ | 18 |
|   |   |   |   |   |   | polymer | 82 |
| 7 | $C_2F_4$, 100 | None | 43.1 | 65 | 30 | $\lfloor (CF_2)_3 \rfloor$ | 0.25 |
|   |   |   |   |   |   | polymer | 99.75 |
| 8 | $C_2F_4$, 100 | do | 42.9 | 167 | 120 | $\lceil (CF_2)_3 \rceil$ | 12.6 |
|   |   |   |   |   |   | polymer | 87.4 |
| 9 | $C_2F_4$, 93.9 | $CF_2=S$, 6.1 | 30.0 | 300 | 64 | $\lceil CF_2CF_2S \rceil$ | [1] 21 |
| 10 | $C_2F_4$, 50 | $CF_2=CFCl$, 50 | 30 | 13 | 40 | $\lceil (CF_2)_3 \rceil$ | [1] 15 |

Table II—Continued

| Run No. | Source of Singlet: $CF_2$ Mole Percent | Second Reactant and/or Diluent, Mole Percent | P.s.i.a. | Min. | °C. | Products | Percent Yield |
|---|---|---|---|---|---|---|---|
| 11 | $CF_2$=CFCl, 65 | $C_3H_8$, 35 | 26.7 | 420 | 69 | $\overline{CF_2CFClCF_2}$ | [1] 15 |
|   |   |   |   |   |   | $\overline{(CF_2)_3}$ | [1] 25 |
| 12 | $C_2F_4$, 29 | $CF_3CF$=$CF_2$, 61; $C_3H_8$, 10. | 25.7 | 1,080 | 68 | $\overline{CF_2CFClCF_2}$ | [1] 75 |
|   |   |   |   |   |   | 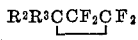 | [1] 10 |
|   |   |   |   |   |   | $\overline{(CF_2)_3}$ | [1] 5 |
|   |   |   |   |   |   | $\overline{(CF_2)_4}$ | [1] 2 |
|   |   |   |   |   |   | $CF_3CF$=$CFCF_3$ | [1] 20 |

[1] Percent Conversion.

Products of the types

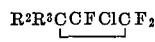

and $$\overline{R^2R^3CCFClCF_2}$$

are useful as solvents, refrigerants and intermediates. The reaction of perfluorocyclopropane with bromine to form $Br(CF_2)_3Br$ is a typical use as an intermediate. The other members of the class undergo analogous reactions.

These 1,3-dibromoperfluoroalkanes are valuable as intermediates for preparing telomers as described by Barnhart in U.S. 2,875,253.

Products of the type

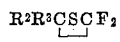

being episulfides, are valuable intermediates for preparing polymers. For example, tetrafluoroethylene episulfide is readily polymerized to a high molecular weight polysulfide which is a valuable polymer. Many other uses for compounds of this class will be apparent to those skilled in the art.

The starting materials $CF_2$=$CF_2$, $CF_2$=CFCl, $CF_3CF$=$CF_2$, CFCl=CFCl, $CF_2$=$CCl_2$, CFCl=$CCl_2$, $$C_nF_{2n+1}CF=CF_2, \ (C_nF_{2n+1})_2C=CF_2, \ CF_2=S$$

CFCl=S, $CCl_1$=S, and the like are well known to the art. Perfluorothioketones, $(R_f)_2C$=S, are available by a number of means, typical of which is that described in U.S. 2,970,173.

It is understood that the preceding examples are representative and that said examples may be varied within the scope of the total specification, as understood by one skilled in the art, to produce essentially the same result.

As many apparently widely different embodiments of this invention may be made without departing from the spirit and scope thereof, it is understood that this invention is not limited to the specific embodiments thereof except as defined in the appended claims.

The embodiments of the invention in which an exclusive property or privilege is claimed are defined as follows:

1. A process for producing: $CF_2$ in the singlet state which comprises subjecting to ultraviolet radiation a compound of the formula $R^1CF$=$CF_2$ and from one to about 50 mole percent of a diluent, said diluent being selected from the group consisting of alkanes, alkenes and compounds of the formula $R^2R^3C$=X, wherein $R^1$, $R^2$, and $R^3$ are selected from the group consisting of fluorine, chlorine, and perfluoroalkyl groups containing 1 to 10 carbon atoms, and X is selected from the group consisting of sulfur, the CFCl group and the $CF_2$ group; wherein said compound of the formula $R^1CF$=$CF_2$ and diluent are subjected to ultraviolet radiation in the range of 2000 A. to 3000 A. at a reaction temperature of from 20° C. to 250° C. and at a reaction pressure of at least ½ atmosphere, and wherein said diluent has sufficient vapor pressure at the reaction temperature to provide the required concentration of diluent in the vapor phase and said diluent and $R^1CF$=$CF_2$ are different.

2. A process which comprises contacting and reacting :$CF_2$ in the singlet state; produced according to the process of claim 1 with a compound of the formula $R^2R^3C$=X, wherein $R^2$ and $R^3$ are selected from the group consisting of fluorine, chlorine and a perfluoroalkyl group and X is selected from a group consisting of sulfur, CFCl group and $CF_2$ group, said reaction being carried out in the vapor phase at a temperature of 20° C. to 250° C. and a pressure of at least ½ atmosphere and obtaining as a resultant product a compound of the formula

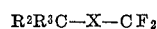

and wherein $R^2$, $R^3$ and X are defined as aforesaid.

3. A process for producing :$CF_2$ in the singlet state which consists essentially of subjecting to ultraviolet radiation $CF_2$=$CF_2$ and from one to about 50 mole percent of $C_2H_4$, wherein said reactants are subjected to ultraviolet radiation in the range of 2000 A. to 3000 A. at a reaction temperature of from 170 C. to 210° C. and at a reaction pressure of from 38.7 to 45.7 p.s.i.a.

4. A process which consists essentially of contacting and reacting :$CF_2$ in the singlet state, produced according to the process of claim 1, with $CF_2$=$CF_2$ at a temperature of from 20° C. to 250° C. and a pressure of from 0.5 to 5 atmospheres and obtaining as a resultant product a compound of the formula

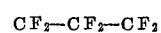

References Cited by the Examiner

UNITED STATES PATENTS

| 2,979,539 | 4/1961 | Errede et al. | 260—653.3 |
| 3,129,248 | 4/1964 | England | 204—163 |

OTHER REFERENCES

Park et al.: Ind. and Eng. Chem., vol. 39, No. 3, pages 354–358 (1947).

Simons et al.: Nature vol. 192, pages 943–4 (1961).

Annual Report of the Chemical Society, vol. 54, pp. 177–179 (1959).

JOHN H. MACK, *Primary Examiner.*

LEON ZITVER, WINSTON A. DOUGLAS, *Examiners.*